US007280040B2

(12) United States Patent
DeVaul

(10) Patent No.: US 7,280,040 B2
(45) Date of Patent: Oct. 9, 2007

(54) DISTRIBUTED MULTI-NODAL VOICE/DATA COMMUNICATION

(75) Inventor: Richard W. DeVaul, Somerville, MA (US)

(73) Assignee: AWare Technologies, Inc., Cambridge, MA (US)

( * ) Notice: Subject to any disclaimer, the term of this patent is extended or adjusted under 35 U.S.C. 154(b) by 84 days.

(21) Appl. No.: 11/087,098

(22) Filed: Mar. 22, 2005

(65) Prior Publication Data
US 2006/0214785 A1 Sep. 28, 2006

Related U.S. Application Data

(60) Provisional application No. 60/554,696, filed on Mar. 21, 2004.

(51) Int. Cl.
*G08B 1/08* (2006.01)
*H04Q 7/00* (2006.01)
(52) U.S. Cl. .................. 340/539.11; 455/11.1; 455/404.1
(58) Field of Classification Search ............ 340/539.1, 340/539.11, 539.13, 539.22, 539.26–29, 573.1; 455/422.1, 432.1, 11.1, 404.1
See application file for complete search history.

(56) References Cited

U.S. PATENT DOCUMENTS 6,141,533 A * 10/2000 Wilson et al. ............. 455/11.1
6,812,840 B2 * 11/2004 Gehlot et al. ............ 340/572.1

* cited by examiner

*Primary Examiner*—Daniel Wu
*Assistant Examiner*—Travis R. Hunnings

(57) ABSTRACT

The invention comprises systems and methods of creating and maintaining a communications network. It includes a wearable system, a deployable system, an array of physiological sensors, an array of environmental sensors, and the integration of these into a multi-nodal voice and data communication system. The primary communications network is composed of body-worn communications nodes comprising sensors, wearable audio/video communications gear, and wireless digital transceivers. The deployable system supports and extends the body-worn network by providing wider communications coverage, situational environmental monitoring, and navigational aid. The deployable system is composed of small, self-contained, robust network nodes. Each such node combines environmental sensors, a digital wireless "repeater," and a navigational beacon capability integrated in a hardened, robust package. Nodes are carried by team members and deployed when needed to extend the range of the communications or sensor network.

4 Claims, 3 Drawing Sheets

DISTRIBUTED MULTI-NODAL VOICE/DATA COMMUNICATION

CROSS-REFERENCE TO RELATED APPLICATIONS

Provisional Application 60/554696, filed Mar. 21, 2004

FEDERALLY SPONSORED RESEARCH

Not Applicable

SEQUENCE LISTING OF INVENTION

Not Applicable

1. Field of the Invention

This invention relates to devices and methods that promte safety and provide commnications for workers who must operate in hazardous areas.

2. Background of the Invention

This application claims priority from provisional application No. 60/554696, filed Mar. 21, 2004.

Teams of individuals often must cooperate in a hazardous field environment, away from an office or other fixed base of operation. Many of the dangers faced by teams operating in a hazardous environment can be mitigated by effective communications, including real-time monitoring of the health/status of team members and environmental conditions. Unfortunately, the very conditions that create these dangers can also interfere with effective communications, and existing communications technology is not adequate to the task. Failures in communications and situation awareness have been directly linked to injuries and fatalities, including such high-profile tragedies as the Worcester, Mass. warehouse fire tragedy where six firefighters died on 3 Dec. 1999, and the now-famous communications and coordination breakdowns surrounding the 9/11 World Trade Center attacks. Regarding the Worcester warehouse file, NIOSH Fatality Assessment and Control Evaluation Investigative Report Number 99F47 made certain observations and recommendations. Among the recommendations are the following:

"Recommendation #5: Fire departments should ensure that Incident Command always maintains close accountability for all personnel at the fire scene.

Recommendation #13: Manufacturers and research organizations should conduct research into refining existing and developing new technology to track the movement of fire fighters on the fireground."

Firefighters face an unusually large array of hazards and communications difficulties (such as smoke, high temperatures, blind navigation through unfamiliar environments, and the like) but similar challenges are faced by police, paramedics, disaster response teams, and homeland security workers, as well as those that respond to industrial accidents or simply work routinely under hazardous conditions. Teams that must coordinate work under hazardous conditions all have the following needs. In a definable, hazardous area, they need:

To communicate data and voice among the team,

To communicate to others outside of the hazardous area,

To assess and convey information on the location of team members,

To sense (or discern), assess and convey information on the environment,

To assess and convey information on the health of team members, and

To adapt as the environment changes, and as team members become physically farther apart, to maintain communication and assessment Further, human beings who operate in hazardous environments must respond quickly and effectively to changing circumstances. Distraction caused by unnecessary communications chatter or the constant monitoring of equipment can create serious risks to workers operating under these conditions. Improvements in communications and monitoring may actually be worse than useless if the worker is overwhelmed with a flood of irrelevant or hard-to-interpret data. For example, US firefighters currently employ Personal Alert Safety System, or PASS, alarms, which are simple motion sensors that sound if the firefighter has been stationary for longer than a preset interval. A PASS is also known as a Personal Alarm Safety (PAL) System. PASS and PAL devices sound an alarm if the wearer does not move, or when manually activated. These devices do a poor job of discriminating between an unconscious or injured firefighter and one who is simply resting or waiting.

Team coordination problem is not limited to human applications. If animals are used (such as dogs for search-and-rescue, dolphins for some hazardous naval tasks, and other animals in helping roles) useful status, performance, environmental monitoring, and communications capabilities can be provided, although sensors and interaction capabilities will need to be appropriately adapted to circumstances. The invention is intended to cover those situations, as well.

SUMMARY OF THE INVENTION

It is an object of the invention to provide communication among workers who must work in hazardous areas, and to others outside of the hazardous areas.

It is a further object of this invention to provide health, safety, and location information to workers who must work in hazardous areas, and to others outside of the hazardous areas, involuntarily.

The invention comprises systems and methods of creating and maintaining a communications network. It includes a wearable communication system, a deployable communication system, an array of biometrics sensors, an array of environmental sensors, and the integration of these into an effective system multi-nodal voice and data communication system and network. The primary communications network is composed of body-worn communications nodes that are composed of sensors, wearable audio/video communications gear, and wireless digital radio transceivers. The deployable communication system supports and extends the body-worn network by providing wider communications coverage, situated environmental monitoring, and navigational aid. The deployable communications system is composed of small, self-contained, robust network nodes called "softballs." A "softball" combines environmental sensor, a digital wireless "repeater," and a navigational beacon capability integrated in a hardened, robust package. "Softballs" are carried by team members and deployed when needed to extend the range of the communications or sensor network. The term "softball" denotes the approximate size of the deployable device, and further denotes attributes of portability that allow one to carry the device in a typically sized pocket or pouch. Further, the term denotes the technique associated with the manner of use, as a set of devices that are tossed, dropped, or placed at appropriate times and locations. For convenience of this disclosure, this deployable node shall be referred to as the "softball."

Collections of physiological and/or environmental monitoring sensors are integrated through wired or wireless short-range connections for use on the body or in a "softball," and tied together through the larger digital communications network.

The invention is viable in a definable geographic area, where the geographic area may be physically closed (such as a building or cave), or physically open, but bounded by the circumstances of the particular incident (such as by fire or by hazardous material). Communication with others outside of the defined, hazardous area is effected with gateways and bridges to other voice and data communication systems in other geographic areas. These other geographical areas may be adjacent to the hazardous area, such as in the case of a situation commander being near the site, or remote.

Depending upon the hazard and environment to be faced, a particular selection of biometrics and environmental sensors will vary. However, a minimal set of biometrics and environmental sensors is contemplated to cover currently known and anticipated hazards. Sensors are deployed on and about the wearer's body, as well as to support equipment, such as self-contained breathing apparatus, canteens, and others.

The operation of this system includes the following, autonomous steps, that are to be taken with minimal physical or mental effort by the user:

Receiving particular information through the sensors about the environment,

Communicating that information to others in the system,

Reacting to that information to alert, with varying prominence, the user or others, Reacting to that information to take autonomous action according to selection criteria, and Reacting to that information to change the selection criteria.

Operation of this system further includes preserving communication connectivity, which is accomplished in part by the user actuating and deploying the softball manually, the use of means and methods for self-actuation and deployment of the softball, and allowing the entire system to have both capabilities (manual and automatic deployment and activation) concurrently. This device operates to extend the range beyond the point where the signal degrades to a certain but still viable level, allowing the wearer to continue farther while connected to the network. The effect of these devices is to create a chain of connectivity between and among wearers, and maintaining connections to individual and systems outside of the hazardous area.

The process of operation of this system includes giving effect to certain rules and criteria (signal-to-noise ratio, link quality, and others) for the softball to deploy and to become operable, either manually or automatically, in order to maintain communication connectivity.

Further, the system and processes provide a means for locating particular team members within the defined, geographical area.

A critical feature of the technology described here is the capability for automatic, real-time analysis of sensor data to detect hazardous conditions and identify threats. The system described here can provide continuous physiological and activity state monitoring of team members, not only reducing false positives in alarming but also predicting in advance when a team-member may be at risk, by identifying risk-factors such as hyper- or hypothermia, fatigue, sickness, etc. Similar monitoring of environmental conditions can also be carried out automatically, detecting elevated environmental toxins, temperature, the presence of radiation, and other parameters. Importantly, team members receive only the alarms and reports that are relevant to their current task and activity state, mitigating distraction and freeing up person-to-person communications channels for coordination and other uses. The raw data is always available for review if requested, and logged for later analysis.

BRIEF DESCRIPTION OF THE DRAWINGS

FIG. 1A is a close-up view of a team member, and the equipment that each would wear or carry.

DETAILED DESCRIPTION

A complete understanding of the present invention may be obtained by reference to the accompanying drawings, when considered in conjunction with the subsequent, detailed description For purposes of clarity and brevity, like elements and components will bear the same designations and numbering throughout the Figures.

Figure 1:
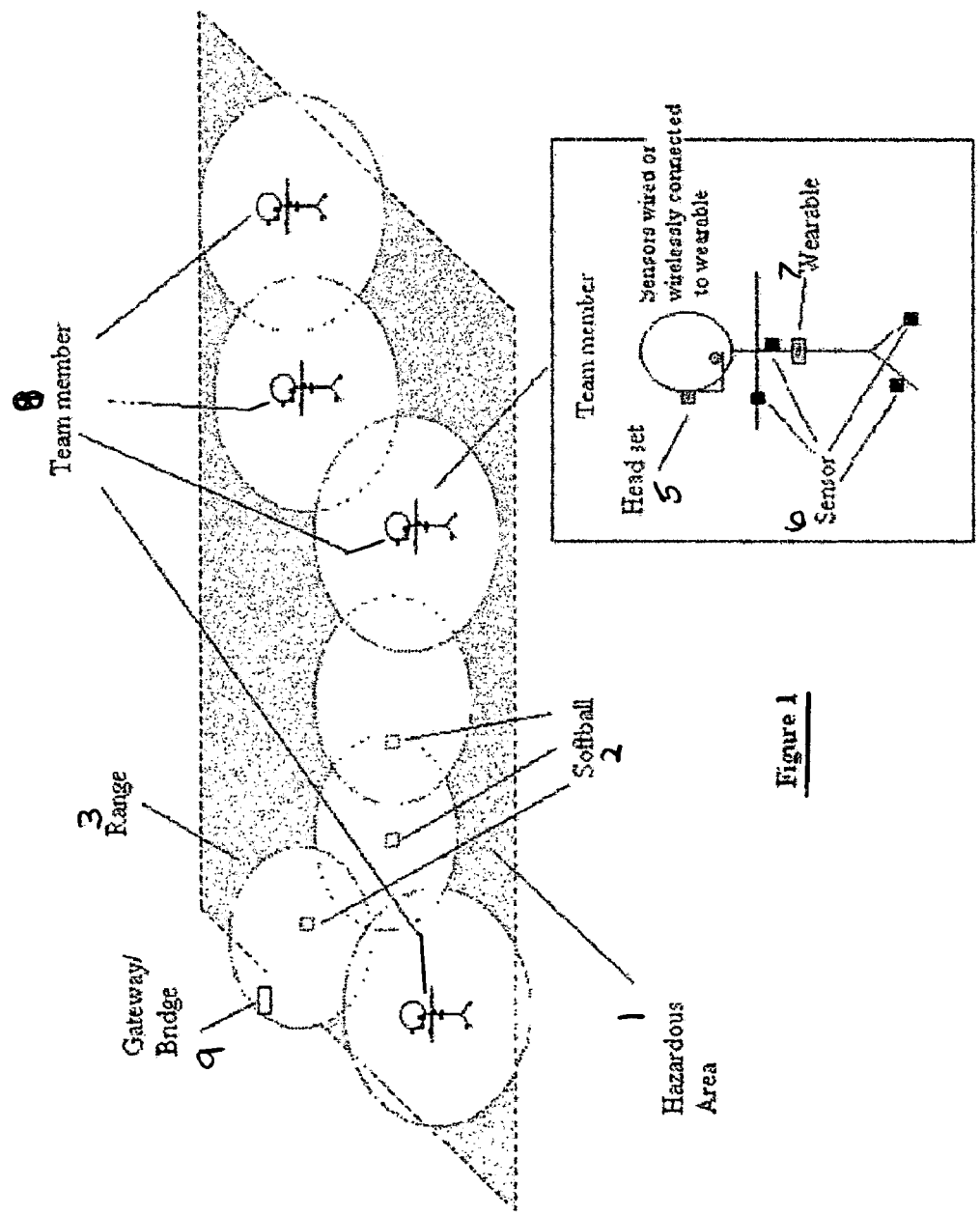
FIG. 1 shows an overview of the invention in use by a team of individuals operating in a hazardous area. The intersecting circular areas indicate effective communication range of each device at the center. The chain of intersections completes the communication path.

FIG. 1 shows the major components of the invention as used in a hazardous area (1). Depicted are team members (8). A shown in FIG. 1A, each team member is equiped with a wearable communication system device (7), biometrics and support equipment sensors (6) attached thereto and to the wearer or to the support equipment, environmental sensors attached to the wearable communication system, headset (5) with earphone and microphone, and appropriate interface means. FIG. 1 further shows the deployable, softball communication system devices (2), with attached environmental sensors, and appropriate interface means. Each wearable system (7) and each softball (2) individually has an effective range (3), as shown. Communication is preserved, as shown, when the ranges intersect to form complete paths among wearers and softballs.

Further, FIG. 1 shows a gateway or bridge (9) for connecting the multi-nodal voice/data communication system to the outside world.

Figure 2:
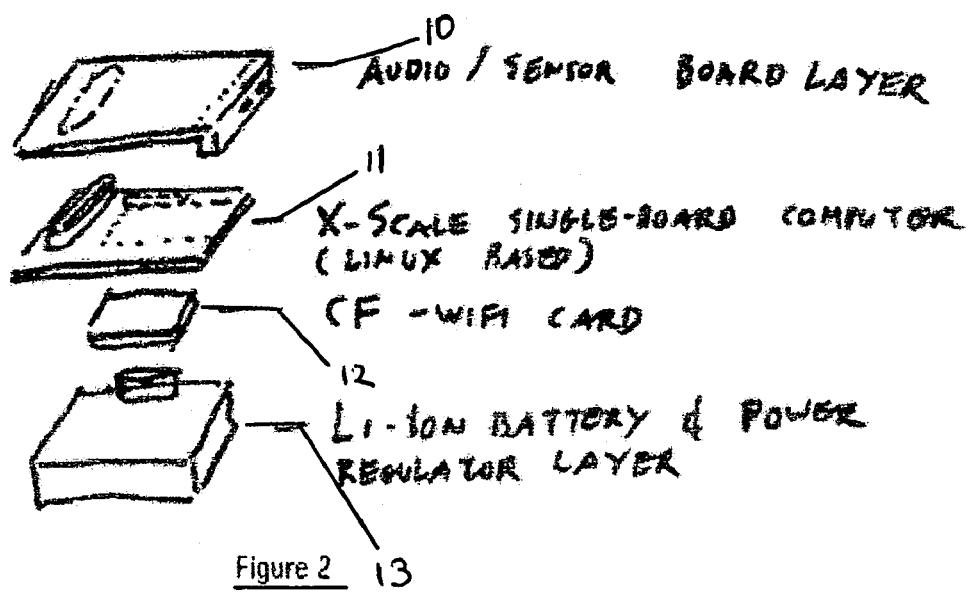
FIG. 2 is an exploded view of the components of a softball node.

FIG. 2 shows a detailed view of a basic device node, configurable as wearable or deployable. The node comprise four layers: a power layer (13), typically including a battery and regulator, for supplying power to the node; a wireless interface layer (12) for creating the wireless link to other nodes; a computer processor system layer (11), typically comprising a microprocessor, random access memory for short term and relatively longer term storage, and including and operating system and application software for driving the devices in all layers; and, an audio/sensor layer (10), for receiving information from sensors, for receiving voice information from a team member (8), and for sending audible signals, including voice information via earphone or similar devices, to the tem wearer.

FIG. 2 shows the layers stacked vertically, resulting in a package of approximately 9 cubic inches, more or less. The layers may be configured horizontally, and connected with flexible wiring assemblies. The resulting package in this configuration is approximately 9 inches by 3 inches by 1 inch, more or less.

Total weight of each configuration is less than 1 pound, more or less. Size and weight of the wearable (7) enables the device to be easily donned, worn, and doffed. Size and weight of the softball (2) enables easy portability, and easy tossing, dropping, or placing as required.

Figure 3:
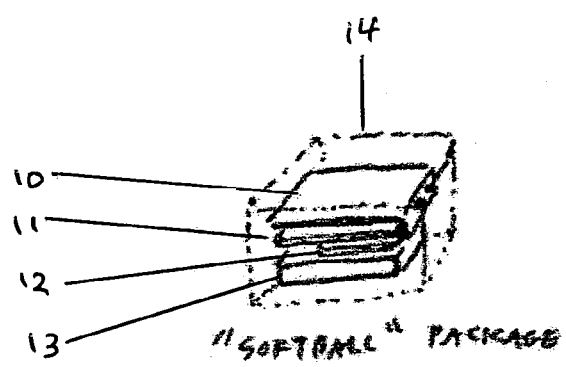
FIG. 3 is a view of the softball components as packaged.
Figure 3A:
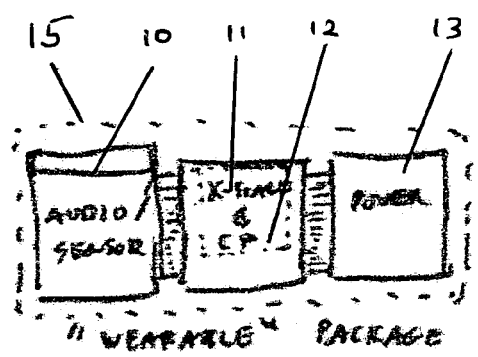
FIG. 3A is a view of the wearable configuration of the softball node.

FIG. 3 shows one configuration (14) of an assembled deployable softball (2) device. FIG. 3A shows one configuration (15) for an assembled wearable (7) device. The softball (2) and the wearable (7) comprise largely the same components.

Each team member (8) will be equipped with exactly one wearable (7) configuration that is integrated into or onto protective clothing. Breathing apparatus sensors, alarms indicators, audible devices, and microphones are connected to the audio/sensor board (10).

Each team member (8) is further equipped with zero or more softball (2) units, each such unit having integrated external shock and temperature sensors, a navigational beacon capability, and possible additional sensors appropriate to the situation (for example chemical sensors for hazardous material ("hazmat") response, radiation sensors/biological agent sensors for terror response, and similar situations).

Normally, each wearable (7) device is on and active during the period that the wearer is on task. Normally, the softball (2) is off and inactive, until manually deployed and activated by a wearer. Manual activation is simple, such as by pulling a pin or otherwise engaging an enabling switch. In other configurations, the softball (2) may be deployed and activated automatically upon occurrence of certain criteria that indicate that the wearer is approaching the limit of communication and network range and effectiveness. Among these criteria is signal strength degrading to a certain level.

The communication is done over a wireless network. As the wearer moves about in the hazardous area (1), voice and sensor data are relayed in broadcast or point-to-point mode to team mates or to others outside of the hazardous area (1) through a wireless interface. Appropriate wireless interfaces include those that adhere to the IEEE 802.11 standards, including 802.11a,b, and g. For short-range, on-body wireless communications between sensors and other wearable components, IEEE 802.15.4-compliant RF or near-field capacitive or magnetic are appropriate. Existing dynamic ad hoc routing algorithms will ensure logical connection of all nodes within the network, as well as addressing connections to gateways and bridges (9) to the others outside of the hazardous area.

At critical locations where the wearer is approaching the limit of communication and network range and effectiveness, as determined by link quality, signal to noise ratio criteria, and other criteria, a wearer would deploy the softball in order to maintain connectivity. Once deployed and activated, these devices also monitor the external environment for critical hazards such as high temperature, explosion, structure collapse, and other hazards. These devices communicate this information over the network.

The network as the collection of wearable (7) and softball (2) nodes, gateways and bridges (9), will detect the failure of any such node. Each such node continuously broadcasts status information that includes information about the local topology. All such information is logged and made available to others outside, such as situation commanders.

Those of reasonable and ordinary skill in the art will anticipate enhancements, including additional sensors; bio-metrics and environmental sensor sets selected for particular hazardous areas; sensor sets for selected for individual wearer needs according to job function, pre-existing health condition, or other parameters; additional networking technologies; additional and alternative network routing methodologies; and similar improvements. Further, information and alarms may be presented to the wearer in visual form, such as through a head mounted display device. All such anticipated enhancements are fully within the scope of this disclosure.

Other modifications and changes, that may be required to fit particular operating requirements and environments, will be apparent to those skilled in the art. Thus, the invention is not considered limited to the example chosen for purposes of disclosure, and covers all changes and modifications that do not constitute departures from the true spirit and scope of this invention.

While the foregoing detailed description has described several embodiments of the invention in accordance with principles of the invention, it is to be understood that the above description is illustrative only and is not limiting of the disclosed invention. Particularly other configurations of the invention may include wireless communication methods. Thus, the invention is to be limited only by the claims set forth below.

Having thus described the invention, what is desired to be protected by Letters Patent is presented in the subsequently appended claims.

The invention claimed is:

1. A multi-nodal system for voice and data communication among local and distant team members, comprising
   (a) at least one mobile wireless communication means, further comprising an effective communication range, said at least one mobile wireless communication means further being deposed upon at least one local team member, and said at least one mobile wireless communication means further conveying voice communication from the local team member;
   (b) at least one deployable wireless communication means, further comprising an effective communication range, said at least one deployable wireless communication means further being ported by at least one local team member;
   (c) at least one wireless communication medium between and among said at least one mobile wireless communication means and said at least one deployable wireless communication means, said at least one wireless communication medium being operable within said effective communication range of said at least one mobile wireless communication means or said deployable wireless communication means, respectively;
   (d) gateway means for conveying information from said at least one mobile wireless communication means or said at least one deployable wireless communication means to the distant team members;
   (e) network means linking said at least one mobile wireless communication means, said at least one deployable wireless communication means, said at least one wireless communication medium, and further enabling the conveyance of the voice and data information;
   (f) means for determining location information of one said at least one mobile wireless communication means or one said at least one deployable wireless communication means, further comprising means for conveying said location information through said network means;

(g) means for sensing environmental data with respect to said at least one mobile wireless communication means or said at least one deployable wireless communication means;

said at least one;

(h) said at least one mobile wireless communication means and said at least one deployable wireless communication means being physically located so that the respective effective communication ranges intersect, thereby creating an effective communication path;

(i) means for determining when one said at least one deployable wireless communication means must be activated and deployed in order to maintain said effective communication path, further comprising means for deploying one said at least one deployable wireless communication means; and, (j) means for determining when one local team member disposed with one said at least one mobile wireless communication means is in distress, further comprising means for conveying distress information through said network means.

2. The multi-nodal system for voice and data communication in claim 1 wherein said means for sensing environmental data further comprises sensing biometric and vital sign information of the local team member deposed with said at least one mobile wireless communication means.

3. The multi-nodal system for voice and data communication in claim 1 wherein said means for sensing environmental data further comprises physical information of an area deposed with said at least one deployable wireless communication means.

4. The multi-nodal system for voice and data communication in claim 1 wherein said means for sensing environmental data further comprises sensing viability information of support equipment employed by the local team member deposed with said at least one mobile wireless communication means.

* * * * *